(12) United States Patent
Tucker et al.

(10) Patent No.: US 8,047,771 B2
(45) Date of Patent: Nov. 1, 2011

(54) TURBINE NOZZLES AND METHODS OF MANUFACTURING THE SAME

(75) Inventors: Bradley Reed Tucker, Chandler, AZ (US); Mark C. Morris, Phoenix, AZ (US); Jason Smoke, Phoenix, AZ (US); Daniel Ryan, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 576 days.

(21) Appl. No.: 12/272,206

(22) Filed: Nov. 17, 2008

(65) Prior Publication Data

US 2010/0124492 A1    May 20, 2010

(51) Int. Cl.
*F04D 29/44* (2006.01)
(52) U.S. Cl. .................................... 415/137; 415/209.4
(58) Field of Classification Search .................. 415/191, 415/137, 209.3, 209.4
See application file for complete search history.

(56) References Cited

U.S. PATENT DOCUMENTS

| | | | |
|---|---|---|---|
| 3,909,157 A * | 9/1975 | Wachtell et al. ............ 415/208.3 |
| 4,023,251 A * | 5/1977 | Darrow .................... 29/889.721 |
| 4,096,615 A | 6/1978 | Cross | |
| 4,728,258 A * | 3/1988 | Blazek et al. ................. 415/137 |
| 4,869,645 A | 9/1989 | Verpoort | |
| 5,248,240 A | 9/1993 | Correia | |
| 5,332,360 A | 7/1994 | Correia et al. | |
| 5,672,261 A * | 9/1997 | Wheat et al. ................... 205/206 |
| 5,679,464 A | 10/1997 | Konya et al. | |
| 5,813,832 A | 9/1998 | Rasch et al. | |
| 6,056,507 A | 5/2000 | Wheat et al. | |
| 6,103,186 A * | 8/2000 | Sievers et al. ..................... 419/8 |
| 6,345,955 B1 | 2/2002 | Heffron et al. | |
| 6,354,797 B1 * | 3/2002 | Heyward et al. .............. 415/191 |
| 6,637,643 B2 * | 10/2003 | Hasz et al. .................... 228/119 |
| 7,094,450 B2 | 8/2006 | Nagaraj et al. | |
| 7,172,389 B2 | 2/2007 | Hagle et al. | |
| 7,185,433 B2 | 3/2007 | Miller et al. | |
| 7,186,070 B2 | 3/2007 | Morris et al. | |
| 7,331,755 B2 | 2/2008 | Broderick et al. | |
| 7,341,427 B2 * | 3/2008 | Farmer et al. ................. 415/191 |
| 2002/0012709 A1 * | 1/2002 | Davenport et al. ........... 424/725 |
| 2006/0078422 A1 * | 4/2006 | Morris et al. ................. 415/191 |
| 2008/0063520 A1 * | 3/2008 | Baumann et al. .......... 415/209.3 |

\* cited by examiner

*Primary Examiner* — Matthew Landau
*Assistant Examiner* — Robert Bachner
(74) *Attorney, Agent, or Firm* — Ingrassia Fisher & Lorenz, P.C.

(57) ABSTRACT

Turbine nozzles and methods of manufacturing the turbine nozzles are provided. In an embodiment, by way of example only, a turbine nozzle includes a first ring, a vane, and a first joint. The first ring comprises a single unitary component and having a first opening and including a first metal alloy. The vane includes a first end disposed in the first opening and includes a second metal alloy. The first joint is formed in the first opening between the first ring and the vane and includes a first braze layer and an oxide layer. The first braze layer is disposed adjacent to the oxide layer, and the first braze layer and the oxide layer are disposed between the first ring and the vane.

20 Claims, 6 Drawing Sheets

TURBINE NOZZLES AND METHODS OF MANUFACTURING THE SAME

STATEMENT REGARDING FEDERALLY SPONSORED RESEARCH OR DEVELOPMENT

This inventive subject matter was made with Government support under W911W6-08-2-0001 awarded by U.S. Army. The Government has certain rights in this inventive subject matter.

TECHNICAL FIELD

The inventive subject matter generally relates to turbine engine components, and more particularly relates to turbine nozzles and methods of manufacturing turbine nozzles.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust. Other gas turbine engines may use the power to turn a propeller or an electrical generator.

Typically, the stationary turbine vanes of the turbine nozzle extend between an inner ring and an outer ring. The inner and outer rings define a portion of the flowpath along which the combustion gases travel. In some cases, to simplify manufacture of the turbine nozzle, the inner and/or outer rings are initially formed as segments, and the segments are subsequently bonded together. In other cases, the vanes are bi-cast with the inner and outer rings, so that the rings and the vanes form a single, unitary structure.

Although the aforementioned turbine nozzles operate adequately under most circumstances, they may be improved. In particular, in configurations in which the inner and outer rings of the turbine nozzle comprise numerous segments, gas leakage may occur at interfaces between adjacent segments. As a result, a chargeable cooling flow may be unintentionally added to the gas flowing through the turbine nozzle, which may cause the turbine engine to increase fuel consumption. In some instances, leakage between the adjacent segments may result in decreased combustor cooling. Though bi-cast inner and outer rings reduce leakage of turbine nozzles, they may be relatively difficult and/or time consuming to manufacture. Additionally, coatings, such as thermal barrier layers, may be relatively difficult to apply to bi-cast turbine nozzles. In particular, because of limitations with deposition apparatus and processes for forming thermal barrier layers, formation of the thermal barrier layers on the stationary vanes may be a relatively complex process.

Accordingly, it is desirable to have an improved turbine nozzle that has minimal gas leakage and is simpler and less expensive to manufacture than conventional turbine nozzles. In addition, it is desirable for the improved turbine nozzle to be capable of being retrofitted into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine nozzles and methods of manufacturing the turbine nozzles are provided.

In an embodiment, by way of example only, a turbine nozzle includes a first ring, a vane, and a first joint. The first ring comprises a single unitary component and having a first opening and including a first metal alloy. The vane includes a first end disposed in the first opening and includes a second metal alloy. The first joint is formed in the first opening between the first ring and the vane and includes a first braze layer and an oxide layer. The first braze layer is disposed adjacent to the oxide layer, and the first braze layer and the oxide layer are disposed between the first ring and the vane.

In another embodiment, by way of example only, a method of manufacturing the turbine nozzle includes imparting an oxide layer onto a surface of a first end of a vane, inserting the first end of the vane into a first opening in a first ring forming a first joint and inserting a second end of the vane into a second opening in a second ring forming a second joint, applying a first braze material to the first joint, applying a second braze material to the second joint, and transforming the first braze material at the first joint into a slip joint and the second braze material at the second joint into a bonded joint to form the turbine nozzle.

In still another embodiment, by way of example only, a method of manufacturing the turbine nozzle includes imparting an oxide layer onto a surface defining a first opening in a first ring, inserting a first end of a vane into the first opening in the first ring forming a first joint and inserting a second end of the vane into a second opening in a second ring forming a second joint, applying a first braze material to the first joint, applying a second braze material to the second joint, and transforming the first braze material at the first joint into a slip joint and the second braze material at the second joint into a bonded joint to form the turbine nozzle.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
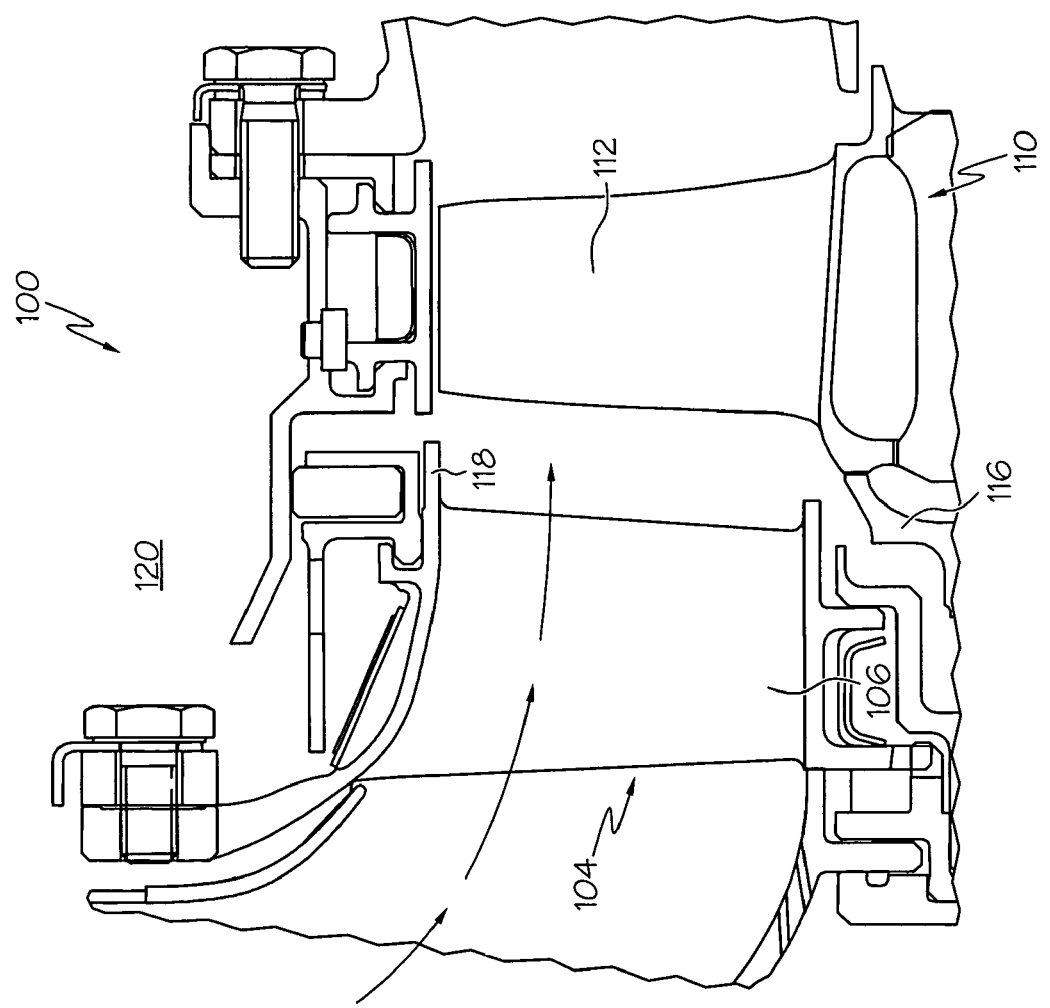
FIG. 1 is a cross-sectional side view of a turbine section of an engine, according to an embodiment.

FIG. 1 is a cross-sectional side view of a portion of a turbine section 100 of an engine, according to an embodiment. The turbine section 100 receives high temperature (e.g., a temperature typically in the range of 1100-1800° C.) gases from an upstream engine combustor (not shown) to produce energy for the engine and/or components coupled to the engine. In an embodiment, the turbine section 100 includes a turbine nozzle 104 that has a plurality of static vanes 106 (only one of which is shown) that direct the gases from the combustor to a turbine 110. According to an embodiment, the turbine 110 includes a plurality of blades 112 (only one of which is shown) that are retained in axial position by a retention plate 116. When the blades 112 are impinged upon by the gases, the gases cause the turbine 110 to spin. According to an embodiment, an outer circumferential wall 118 surrounds the static vanes 106 and the plurality of blades 112 and defines a portion of a compressor plenum 120. The compressor plenum 120 receives bleed air from a compressor section (not shown), which may be directed through one or more openings in the outer circumferential wall 118 towards the plurality of blades 112 to cool the blades 112 and/or static vanes 106.

Figure 2:
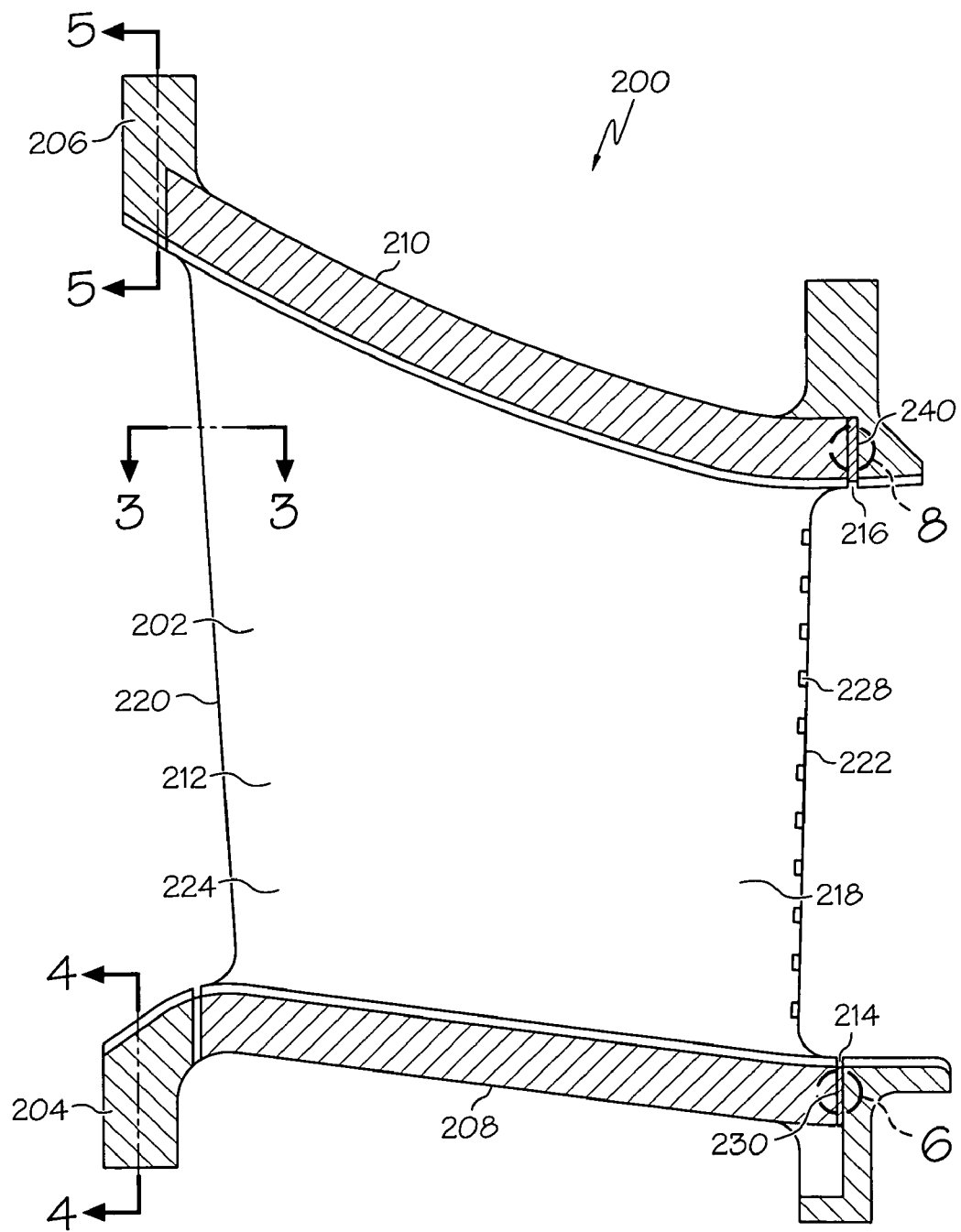
FIG. 2 is a cross-sectional side view of a portion of a turbine nozzle, according to an embodiment.

FIG. 2 is a cross-sectional side view of a portion of a turbine nozzle 200, according to an embodiment. The turbine nozzle 200 includes a plurality of static vanes 202 (only one of which is shown), a first ring 204, and a second ring 206. The vanes 202 extend between the rings 204, 206 and, as will be discussed in more detail below, form joints with the rings 204, 206. In an embodiment, the first ring 204 is disposed concentric to and radially inwardly from the second ring 206. However, in other embodiments, the second ring 206 alternatively may be disposed radially inwardly from the first ring 204. In an embodiment, the first ring 204 may have a diameter in a range of from about 5 cm to about 35 cm, and the second ring 206 may have a diameter in a range of from about 6 cm to about 50 cm. In another embodiment, the diameters of the rings 204, 206 may be greater or less than the aforementioned ranges.

Figure 3:
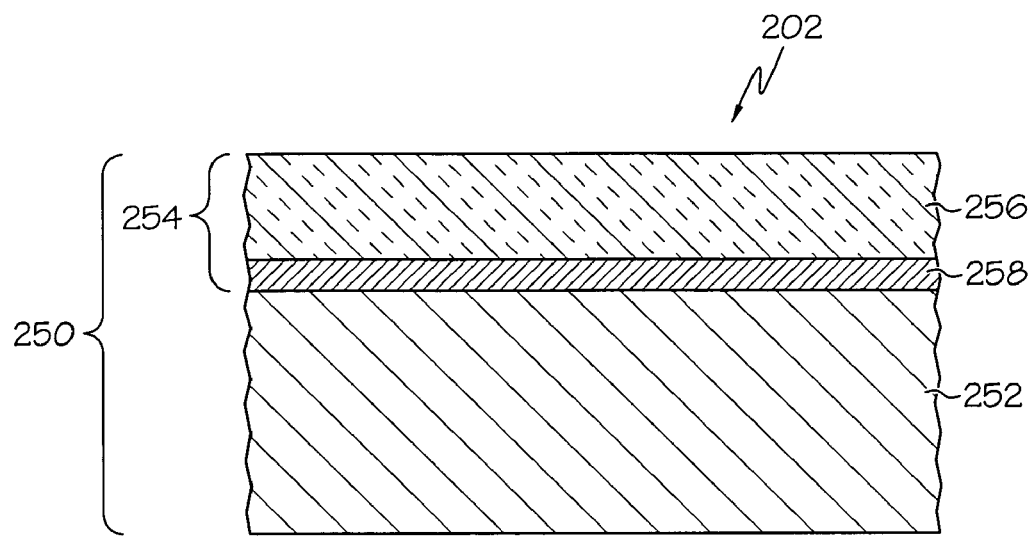
FIG. 3 is a simplified, close-up, cross-sectional view of a static vane taken along line 3-3 in FIG. 2, according to an embodiment.

FIG. 3 is a simplified, close-up, cross-sectional view of the static vane 202 taken along line 3-3 in FIG. 2, according to an embodiment. According to an embodiment, the static vane 202 comprises a parent material 250. In an embodiment, the parent material 250 may include a base material 252. For example, the base material 252 may comprise a metal alloy. In one embodiment, the base material 252 may include a nickel-based superalloy. Suitable nickel-based superalloys include, but are not limited to, INCO718, INCO738, MAR-M-247EA, MAR-M-247DS, and SC180. In other embodiments, the base material may comprise a different superalloy. The base material may be cast into an equiaxed, directionally solidified, or single crystal vane 202.

In accordance with an embodiment, the parent material 250 may include a protective coating 254 that is applied over the base material 252 and that is formulated to improve the useful life of the vanes 202. In an embodiment, the protective coating 254 may have a thickness in a range of from about 0.1 mm to about 0.5 mm. However, a particular thickness of the protective coating 254 may depend on a particular formulation and number of layers included in the protective coating 254, and thus, the protective coating 254 may be thicker or thinner than the aforementioned range. In an embodiment, the protective coating 254 may include a thermal barrier layer 256. Suitable materials for the thermal barrier layer 256 include, but are not limited to a thermal-insulating ceramic material. For example, the thermal-insulating ceramic material may comprise a stabilized zirconia, such as yttria-stabilized zirconia (YSZ). In another embodiment, the thermal barrier layer may comprise cubic zirconia stabilized with about 15% to about 30% by weight yttria. In another embodiment, the thermal barrier layer 256 may comprise tetragonal zirconia stabilized with about 7% to about 8% by weight yttria. In still other embodiments, the thermal barrier layer may include stabilized hafnia and stabilized zirconia, and/or may comprise stabilizing oxides other than yttria, such as calcia, ceria, gadolinia, magnesia, neodymia, samaria, scandia, tantala, and ytterbia. In another embodiment, the protective coating 254 may include an environment-resistant or oxidation-resistant layer 258 and may comprise aluminide or platinum-aluminide. In yet other embodiments, the protective coating may additionally or alternatively include other layers.

Figure 4:
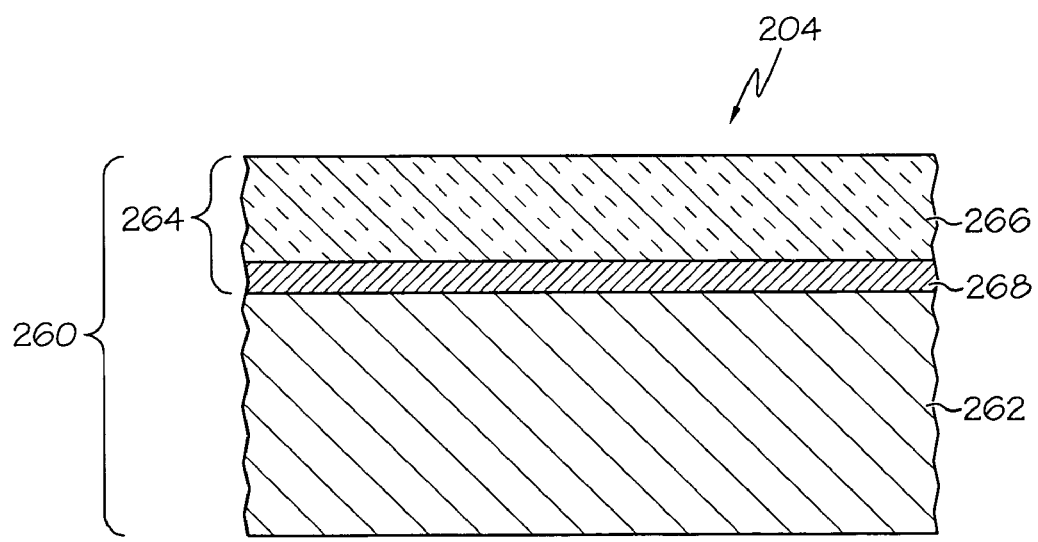
FIG. 4 is a simplified, close-up, cross-sectional view of a first ring taken along line 4-4 in FIG. 2, according to an embodiment.

FIG. 4 is a simplified, close-up, cross-sectional view of the first ring 204 taken along line 4-4 in FIG. 2, according to an embodiment. The first ring 204 may comprise a parent material 260. In an embodiment, the parent material 260 may include a base material 262, which may comprise a metal alloy. In one embodiment, the base material 262 may include material that is similar to the materials included for base material 252 of the vane 202. In another embodiment, the parent material 260 may include a protective coating 264 that may include a thermal barrier layer 266, an environment-resistant or oxidation-resistant layer 268, or another layer. The protective coating 264 may include materials similar to those used for protective coating 254 of the vane 202.

Figure 5:
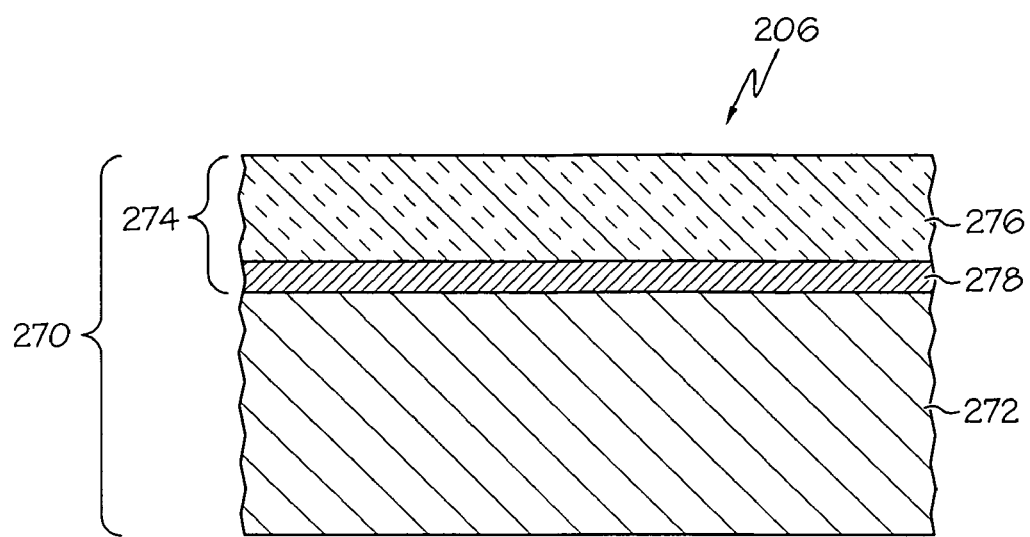
FIG. 5 is a simplified, close-up, cross-sectional view of a second ring taken along line 5-5 in FIG. 2, according to an embodiment.

FIG. 5 is a simplified, close-up, cross-sectional view of the second ring 206 taken along line 5-5 in FIG. 2, according to an embodiment. The second ring 206 may comprise a parent material 270. In an embodiment, the parent material 270 may include a base material 272, which may comprise a metal alloy. In one embodiment, the base material 272 may include material that is similar to the materials included for base material 252 of the vane 202 of base material 262 of the first ring 204. In another embodiment, the parent material 270 may include a protective coating 274 that may include a thermal barrier layer 276, an environment-resistant or oxidation-resistant layer 278, or another layer. The protective coating 274 may include materials similar to those used for protective coating 254 of the vane 202 or the protective coating 264 of the first ring 204.

Depending on a desired configuration, the vanes 202 and/or the rings 204, 206 may include substantially identical base materials. For example, the vanes 202 may include a base material that comprises a first metal alloy, and one or both of the rings 204, 206 may include a base material that includes a second metal alloy and/or a third metal alloy, where the metal alloys are substantially identical in formulation. In another embodiment, the metal alloys are not substantially identical in formulation. In other embodiments, the vanes 202 and/or the rings 204, 206 may include substantially identically formulated protective coatings. In yet other embodiments, the vanes 202 and/or rings 204, 206 may include one or more of the aforementioned layers that comprise the protective coating, and the layers may not be similar in formulation. In still other embodiments, the layers may be substantially identical in formation, but they may be deposited in different sequences or thicknesses.

Returning to FIG. 2, in any case, each vane 202 includes an airfoil 212, a first end 208, and a second end 210. The airfoil 212 has two outer walls 218 (only one of which is shown), each having outer surfaces that define an airfoil shape. The airfoil shape includes a leading edge 220, a trailing edge 222, a pressure side 224 along the first outer wall 218, a suction side along the second outer wall (not shown). In some embodiments, though not shown, the vane 202 may have an internal cooling circuit formed therein, which may extend from an opening in the first end 208 through the vane 202 and may include various passages that eventually communicate with trailing edge openings 228 or other openings (not shown) that may be formed in the vane 202.

Figure 6:
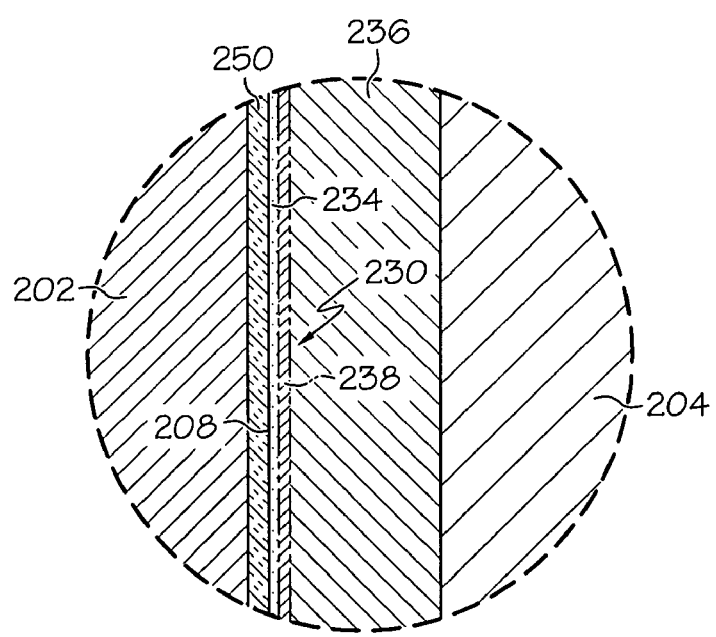
FIG. 6 is a simplified, close-up, cross-sectional view of a first joint indicated by dotted circle 6 in FIG. 2, according to an embodiment.

The first end 208 of the vane 202 is disposed in a respective nozzle opening 214 of the first ring 204 and, as alluded to above, a first joint 230 is included between the vane 202 and the first ring 204. FIG. 6 is a simplified, close-up, cross-sectional view of the first joint 230 indicated by dotted circle 6 in FIG. 2, according to an embodiment. In an embodiment, the first joint 230 is a slip joint. As used herein, the term "slip joint" may be defined as a structure joining two components, where the structure allows linear movement of the two components relative to each other. According to an embodiment, the first joint 230 may be a "low stress" slip joint. A low stress slip joint may be a joint that provides frictional resistance to relative movement between adjacent faces, while also allowing the linear movement between adjacent surfaces. This provision for relative movement between the adjacent surfaces reduces stresses that would occur in the structure if the movement were not permitted. An example of such stresses is thermal stresses induced in nozzles due to the steady state and/or transient temperature gradients during engine operation which result in thermo-mechanical fatigue (TMF). In an embodiment, the first joint 230 may include an oxide layer 234 and a first braze layer 236, in an embodiment. The oxide layer 234 may be disposed over a surface of the first end 208 of the vane 202, which may or may not include the protective coating 250 (shown in phantom). The oxide layer 234 may comprise aluminum, titanium, magnesium, or naturally forming oxides of elements found in the parent material (e.g., parent material 250) of the vane 202. In one embodiment, the oxide layer 234 may comprise an intentionally oxidized portion of the parent material. In another embodiment, the oxide layer 234 may comprise a metal oxide or a braze stop-off material such as aluminum or titanium oxide that is deposited over a surface of the first end 208 of the vane 202. Suitable metal oxides include, but are not limited to aluminum oxide, titanium oxide, and magnesium oxide. The oxide layer 234 may have a thickness in a range of from about 0.002 mm to about 0.05 mm. In other embodiments, the thickness of the oxide layer 234 may be greater or less than the aforementioned range.

The first braze layer 236 may be disposed over a surface of the first ring 204, which may or may not include a protective coating (e.g., protective coating 264), in an embodiment. According to an embodiment, the first braze layer 236 may include a braze alloy suitable for joining the parent material of the first ring 204 to the vane 202, while simultaneously filling the nozzle opening 214 to prevent gas leakage in first joint 230. When subjected to thermal expansion and contraction during engine operation, the bond is capable of inducing cracks at the oxide layer 234 at the first joint 230. Suitable braze alloys include, but are not limited to, AMS4777. The first braze layer 236 may have a thickness in a range of from about 0.01 mm to about 0.2 mm. In other embodiments, the thickness of the first braze layer 236 may be greater or less than the aforementioned range.

Figure 7:
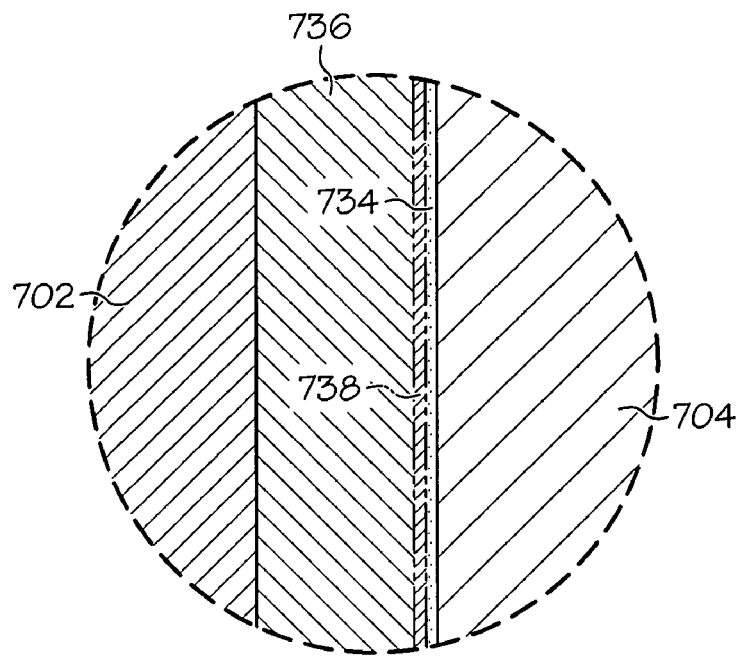
FIG. 7 is a simplified, close-up, cross-sectional view of a first joint, according to another embodiment.

Although the first braze layer 236 is described as being disposed on the first ring 204 and the oxide layer 234 is described as being disposed on the vane 202, in other embodiments, the layers 234, 236 may be disposed on other surfaces. FIG. 7 is a simplified, close-up, cross-sectional view of a first joint 730, according to an embodiment. Here, a first braze layer 736 may be disposed on a vane 702 and an oxide layer 734 may be disposed on a first ring 704.

With continued reference to FIGS. 6 and 7, no matter the particular surfaces on which the braze layer 236, 736 and the oxide layers 234, 734 are formed, bonding of the first braze layer 236, 736 to the oxide layer 234, 734 may be improved by including an adhesion layer 238, 738 (shown in phantom) between the first braze layer 236, 736 to the oxide layer 234, 734. The adhesion layer 238, 738 is adapted to bond the braze material of the first braze layer 236, 736 to the oxide layer 234, 734. Suitable materials from which the adhesion layer 238 may be formed may include, but are not limited to, nickel and alloys thereof. The adhesion layer 238 may have a thickness in a range of from about 0.002 mm to about 0.02 mm, in an embodiment. In other embodiments, the adhesion layer 238 may be thicker or thinner than the aforementioned range.

Figure 8:
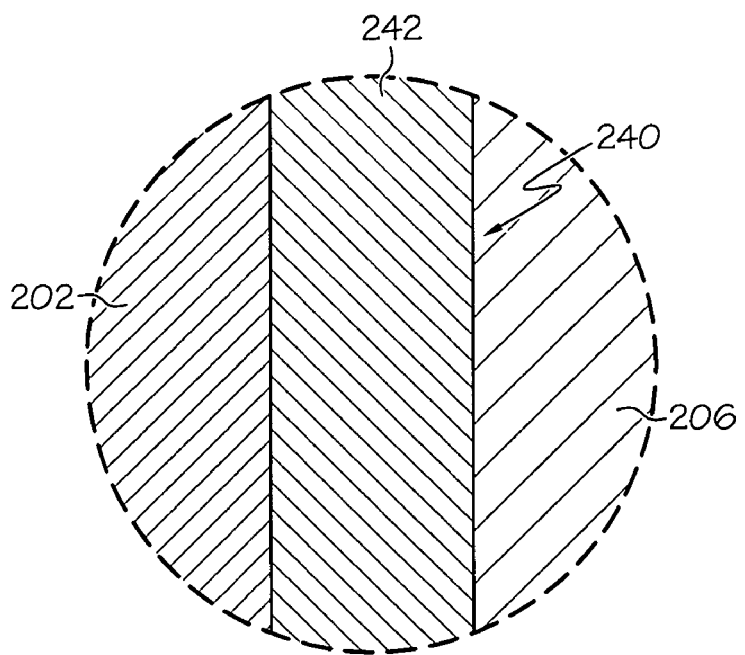
FIG. 8 is a simplified, close-up, cross-sectional view of the second joint indicated by dotted circle 8 in FIG. 2, according to an embodiment.

Referring back to FIG. 2, the second end 210 is disposed in a second nozzle opening 216 of the second ring 206 and includes a second joint 240 between the vane 202 and the second ring 206. FIG. 8 is a simplified, close-up, cross-sectional view of the second joint 240 indicated by dotted circle 8 in FIG. 2, according to an embodiment. The second joint 240 may be a bonded joint. As used herein, the term "bonded joint" may be defined as a structure joining two components that restricts substantially all movement between the two components relative to each other. According to an embodiment, the second joint 240 comprises a second braze layer 242 between the vane 202 and the second ring 206. The second braze layer 242 may comprise a braze alloy. Suitable braze alloys include, but are not limited to AMS4777. In any case, the braze alloys may or may not be similar in formulation to the first braze layer 236 in the first joint 230. The second braze layer 242 may have a thickness in a range of from about 0.01 mm to about 0.2 mm. In other embodiments, the thickness of the second braze layer 242 may be greater or less than the aforementioned range. Prior to brazing, the braze surfaces of 204 in FIG. 6, 702 in FIG. 7, and 202 and 206 in FIG. 8 are prepared using conventional techniques as is known to those skilled in the art to attain acceptable bonding with the braze layer 236 in FIG. 6, 736 in FIG. 7, and 242 in FIG. 8.

According to an embodiment, each of the vanes 202 of the turbine nozzle 200 may have both slip joints (e.g., joint 230) and bonded joints (e.g., joint 240). In other embodiments, selected ones of the vanes 202 of the turbine nozzle 200 may include slip joints, and selected others may include bonded joints. In still other embodiments, all of the vanes 202 of the turbine nozzle 200 may all include only slip joints. In still yet other embodiments, all of the vanes 202 include bonded joints, and selected ones of the vanes 202 may include slip joints.

Figure 9:
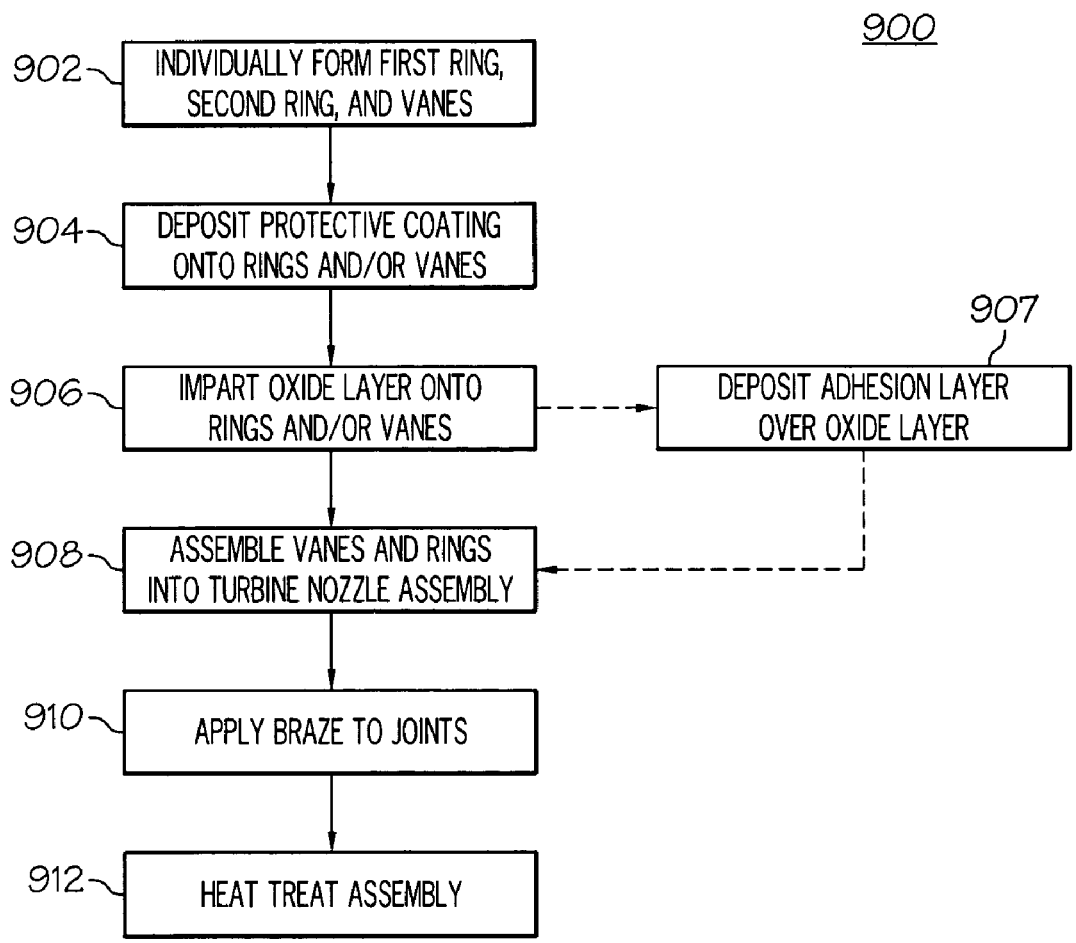
FIG. 9 is a flow diagram of a method of manufacturing a turbine nozzle, according to an embodiment.

In any case, to form the turbine nozzle 200, method 900, a flow diagram of which is provided in FIG. 9 according to an embodiment, may be employed. In accordance with an embodiment, a first ring, a second ring, and a plurality of vanes are individually formed, step 902. According to an embodiment, to minimize gas leakage in a resultant turbine nozzle, each ring may be cast as a single piece. For example, the first ring may be formed as a single piece, and the second ring may be formed as a single piece. For example, each of the rings and/or the vanes may be formed by a lost wax casting process or an investment casting process. In other embodiments, machining processes may be used to machine the rings and/or the vanes into a desired shape. Alternatively, other formation processes may be employed. The rings and/or the vanes may be made from materials, such as the parent materials mentioned above for rings 204, 206 and vane 202.

After the rings and vanes are formed, a protective coating may be deposited onto one or more of the rings and/or vanes, step 904. In accordance with an embodiment, the protective coating may include one or more layers serving as an environmental barrier, an oxidation-resistant coating, or a thermal barrier layer. In an embodiment, the layers may be deposited onto an outer surface of the first ring, if the first ring is intended to be disposed radially inwardly from the second ring. In another embodiment, the layers may be deposited onto an inner surface of the second ring, if the second ring is intended to be disposed radially outwardly from the first ring. In still another embodiment, the layers may be deposited over an entire surface of the first ring and/or the second ring. In still another embodiment, an entirety of the vane may be coated with the layers. Alternatively, desired portions of the vane, such as the airfoil or certain surfaces of the airfoil, may include the layers.

The layers may be deposited in a desired sequence using known techniques, such as plasma spray, cold-gas spray, electron-beam physical vapor deposition, chemical vapor deposition, and the like. In other embodiments, the layers may be deposited using a different process. Each layer may be deposited to a thickness in a range of from about 0.2 mm to about 1.0 mm. In other embodiments, the thickness may be greater or less than the aforementioned range. In accordance with an embodiment, the thermal barrier layer may be deposited over the parent material as an outermost layer, while other layers, such as environmental protection layers, may be deposited prior to the deposition of the thermal barrier layer. To improve bonding between the outermost layer (e.g., the thermal barrier layer) and the parent material, a bond coat may be applied prior to depositing the thermal barrier layer. The bond coat may include oxidation-resistant coatings and diffusion coatings.

An oxide layer is imparted onto desired surfaces of selected vanes and/or desired surfaces of one or both of the rings, step 906. According to an embodiment, the oxide layer is included for forming a slip joint between the vane and the ring, and thus, the desired surface is a surface on either the vane or the ring which will form the slip joint with a corresponding surface. For example, the slip joint may be formed between a vane and the ring intended to serve as an inner ring of the turbine nozzle; hence, the oxide layer may be imparted onto a surface of the vane that will be inserted into a corresponding opening formed in the ring. In another example, the slip joint may be formed between a vane and the ring intended to serve as an outer ring of the turbine nozzle; hence, the oxide layer may be imparted onto a surface of the vane that will be inserted into a corresponding opening formed in the ring or on a surface of the ring defining the opening. In some embodiments, slip joints may be formed between both the inner and outer rings and the vanes. However, in other embodiments, slip joints may be formed only between the vanes and the inner ring or only between the vanes and the outer ring.

The oxide layer may be a layer of material deposited over a desired surface of the parent material of the vane or ring, in an embodiment. In another embodiment, the oxide layer may be an intentionally oxidized portion of the desired surface of the parent material of the vane or ring. In this regard, the oxide layer may be formed using a variety of processing. In one embodiment, the oxide layer may be imparted to the desired surface by utilizing an electro-discharge machining ("EDM") operation. For instance, the EDM operation may include forming a recast layer, which involves producing an electrical discharge having a temperature in a range of from about 10,000° C. to about 30,000° C. to melt the desired surface of the vane or ring thereby forming the recast layer. The recast layer may have a thickness in a range of from about 0.005 mm to about 0.06 mm. In other embodiments, the recast layer may be thicker or thinner than the aforementioned range.

In another example, the oxide layer may be deposited over the desired surface using known techniques, such as plasma spray, cold-gas spray, electron-beam physical vapor deposition, chemical vapor deposition, and the like. In other embodiments, the layers may be deposited using a different process. In an embodiment, the oxide layer may comprise a metal oxide, such as aluminum oxide, titanium oxide, magnesium oxide, naturally occurring oxides of elements of the parent material, or another metal oxide. In another embodiment, the oxide layer may be a braze stop-off material, such as is commercially available such as Nicrobraz® stop-off from the Alloy Products Group at the Wall Colmonoy Corporation of Madison Heights, Mich. According to an embodiment, the deposited oxide layer may be deposited to a thickness in a range of from about 0.01 mm to about 0.2 mm. In other embodiments, the thickness may be greater or less than the aforementioned range. In yet another example, the oxide layer may be formed on the desired surface by subjecting the desired surface to an oxidation process.

In accordance with an embodiment, an adhesion layer may be deposited over the oxide layer, step 907. The adhesion layer may comprise nickel or an alloy thereof and may be deposited by employing a technique, such as plasma spray, cold-gas spray, electron-beam physical vapor deposition, chemical vapor deposition, electro-plating, electroless-plating, grit-blasting, and the like. In other embodiments, the adhesion layer may be deposited using a different process. According to embodiments in which the braze alloy is placed directly in the gap during brazing as described in later step 910, such as with use of a braze foil, the adhesion layer applied in step 907 may be omitted.

Steps 906 and/or 907 may be repeated for selected ones of the vanes, or may be repeated for all of the vanes formed in steps 902 and 904, in an embodiment. In embodiments in which selected ones of the vanes are not used for forming a slip joint with the first and/or second rings, steps 906 and/or 907 may be omitted.

The vanes and rings are assembled into a turbine nozzle assembly, step 908. In an embodiment, first ends of the vanes are inserted into corresponding first openings in the first ring, and second ends of the vanes are inserted into corresponding second openings in the second ring. Consequently, the vanes extend radially outwardly from the first ring to the second ring, when the first ring is configured to serve as the inner ring. To maintain the vanes and rings in position relative to each other, a suitable assembly fixture may be employed. According to an embodiment, calibration gauges may be employed to determine accuracy of positioning of the blades relative to the rings. In another embodiment, surfaces of the vanes and the rings to be joined may be tack welded together to temporarily hold the turbine nozzle assembly together.

Braze materials are then applied to the joints of the assembly, step 910. In accordance with an embodiment, a first braze material is applied to the first joint formed between the first end of the vane and the first ring, and a second braze material is applied to the second joint formed between the second end of the vane and the second ring. In an embodiment, the first and second braze materials may be substantially identical in formulation. In another embodiment, the first and second braze materials may be different formulations. The first and second braze materials may comprise a material similar to the braze material mentioned above for forming the first and/or second braze layers 236, 242. In other embodiments, different braze materials may be employed. In any case, the first and second braze materials may be applied as a paste, as a liquid, as a foil, a powder, or in another conventional form. In an embodiment in which the first and second braze materials are applied as a paste or a liquid, beads of the braze materials may be placed in or adjacent to gaps that may be formed between the ends of the vanes inserted in the openings of the first and second rings. In an embodiment in which the braze materials are applied as a foil, the foil may be disposed over the first and second ends of the vane adjacent to or at least partially in the gaps formed between the vanes and the rings.

After the braze materials are applied, the turbine nozzle assembly is subjected to a heat treatment to transform the first braze material at the first joint into a slip joint and to transform the second braze material at the second joint into a bonded joint, step 912. According to an embodiment, the heat treatment may include heating the turbine nozzle assembly to a temperature that is above a melting temperature of the braze material. In an example, the turbine nozzle assembly may be placed in an autoclave or other oven, which is heated to the temperature. Alternatively, localized heat may be supplied to particular areas of the turbine nozzle assembly via an apparatus such as a hand held laser, and the like. The temperature employed during the heat treatment may be in a range of from about 850° C. to about 1300° C., in an embodiment. However, in other embodiments, the temperature may be greater or less, depending on a melting temperature of the particular braze materials employed.

By including one or more slip joints on the turbine nozzle, cracking, which may occur as a result of thermal expansion and contraction during turbine engine operation, is controlled. In particular, cracking is limited to preferential locations on the turbine nozzle. Additionally, the slip joints allow rings that are manufactured as single, unitary components to be incorporated as part of the turbine nozzle, which may improve fuel efficiency of a turbine engine. In particular, fewer segments may make up the turbine nozzle, which reduces a likelihood of gas leakage as gases flow through the turbine nozzle. The aforementioned steps of the methods for forming the turbine nozzle may be wholly employed, or alternatively, may be employed in part. For example, in some embodiments in which a damaged turbine nozzle may include one or more damaged vanes, the damaged vanes may be removed by EDM or another machining process, and new vanes formed by processes described above may be incorporated into the turbine nozzle.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine nozzle, comprising:
    a first ring comprising a single unitary component and having a first opening and including a first metal alloy;
    a vane including a first end disposed in the first opening, the vane including a second metal alloy; and
    a first joint formed in the first opening between the first ring and the vane, the first joint including a first braze layer and an oxide layer, the first braze layer disposed adjacent to the oxide layer, and the first braze layer and the oxide layer disposed between the first ring and the vane.

2. The turbine nozzle of claim 1, wherein:
    the first joint further including an adhesion layer disposed between the oxide layer and the first braze material.

3. The turbine nozzle of claim 2, wherein:
    the adhesion layer comprises nickel.

4. The turbine nozzle of claim 1, wherein:
    the vane has a second end; and
    the turbine nozzle further comprises a second ring having a second opening, the second end of the vane disposed in the second opening.

5. The turbine nozzle of claim 4, further comprising:
    a second joint formed in the second opening between the second ring and the second end of the vane, the second joint including a second braze material bonding the second ring to the vane.

6. The turbine nozzle of claim 4, wherein:
    the first ring comprises an inner ring; and
    the second ring comprises an outer ring.

7. The turbine nozzle of claim 4, wherein:
    the first ring comprises an outer ring; and
    the second ring comprises an inner ring.

8. The turbine nozzle of claim 1, wherein the first braze layer is disposed on the first ring and the oxide layer is disposed on the vane.

9. The turbine nozzle of claim 1, wherein the first braze layer is disposed on the vane and the oxide layer is disposed on the first ring.

10. A method of manufacturing a turbine nozzle, the method comprising the steps of:
    imparting an oxide layer onto a surface of a first end of a vane;
    inserting the first end of the vane into a first opening in a first ring forming a first joint and inserting a second end of the vane into a second opening in a second ring forming a second joint;
    applying a first braze material to the first joint;
    applying a second braze material to the second joint; and
    transforming the first braze material at the first joint into a slip joint and the second braze material at the second joint into a bonded joint to form the turbine nozzle.

11. The method of claim 10, wherein the first braze material and the second braze material are substantially identical in formulation.

12. The method of claim 10, wherein the first ring comprises an inner ring, and the second ring comprises an outer ring.

13. The method of claim 10, wherein the first ring comprises an outer ring, and the second ring comprises an inner ring.

14. The method of claim 10, further comprising the step of depositing a thermal barrier layer onto the vane before the step of imparting the oxide layer.

15. The method of claim 10, further comprising the step of depositing a thermal barrier layer onto the first ring before the step of imparting the oxide layer.

16. The method of claim 10, wherein the step of imparting comprises subjecting the first end of the vane to an electro-discharge machining process.

17. The method of claim 10, wherein the step of imparting comprises depositing a braze stop-off material to the first end of the vane.

18. The method of claim 10, further comprising depositing a nickel layer over the oxide layer before the step of applying the first braze material.

19. A method of manufacturing a turbine nozzle, the method comprising the steps of:

imparting an oxide layer onto a surface defining a first opening in a first ring;

inserting a first end of a vane into the first opening in the first ring forming a first joint and inserting a second end of the vane into a second opening in a second ring forming a second joint;

applying a first braze material to the first joint;

applying a second braze material to the second joint; and transforming the first braze material at the first joint into a slip joint and the second braze material at the second joint into a bonded joint to form the turbine nozzle.

20. The method of claim 19, wherein the first braze material and the second braze material are substantially identical in formulation.

\* \* \* \* \*